Patented Jan. 12, 1932

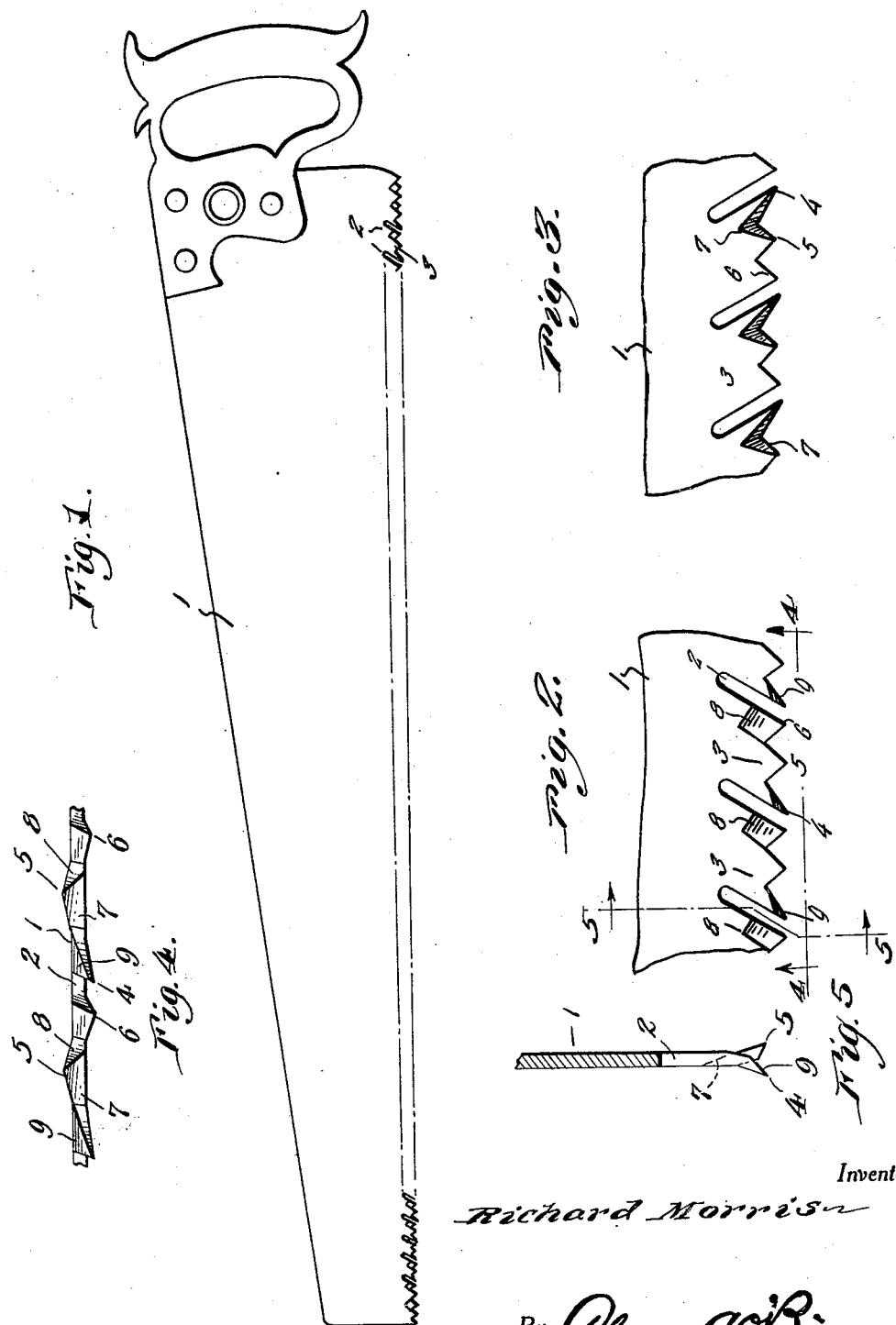

1,840,912

UNITED STATES PATENT OFFICE

RICHARD MORRIS, OF GWINN, MICHIGAN

COMBINED RIP AND CROSSCUT SAW

Application filed July 27, 1931. Serial No. 553,413.

This invention relates to improvements in saws, the general object of the invention being to so form the teeth of the saw that it will act as a rip saw as well as a cross cut saw.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a view looking toward the left side of the saw.

Figure 2 is a fragmentary large view at the left side of the saw.

Figure 3 is a fragmentary view at the right side thereof.

Fig. 4 is a bottom plan view looking as indicated by the line 4—4 of Fig. 2.

Fig. 5 is a section on the line 5—5 of Fig. 2.

As shown in these views, the blade 1 of the saw has its cutting edge provided with a plurality of slots 2 which slope downwardly and forwardly to the small end of the blade and divides the saw into a plurality of sections 3. Each section is formed with a front tooth 4, a center tooth 5 and a rear tooth 6. That portion of the edge between the tip of the tooth 4 to the tip of the tooth 5 is beveled as at 7 on the right side of the blade while the right face of the tooth 6 is straight. On the left side the tooth 6 is beveled as shown at 8 and the tip of the tooth 4 on the left side is beveled as shown at 9.

The front tooth 4 of the group of three teeth is a rip tooth and also a clearance tooth. This tooth is sharpened two ways, that is, it is sharpened as if it were a "square across end tooth", then it is beveled on the opposite side, with the point to one side and not in the center.

The center and end teeth 5 and 6 of each group are cross cut, cutting teeth. They also help to carry the sawdust out of the saw cut.

All the teeth in each group are set; teeth 4 and 6 are set in one direction while 5 is set in the opposite direction. This keeps the saw from binding while severing the fibres of wood. All teeth in each group are of the same length.

This formation of the tooth enables the saw to be used as a cross cut saw or a rip saw. The tooth 4 acts to clear the way for the other tooth making the saw do the work as is otherwise required for two saws.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention what I claim as new is:

A saw of the class described comprising a blade having a cutting edge divided by diagonally arranged slots into a number of sections, each section being formed with a front tooth, a center tooth and a rear tooth, the front and rear teeth being set in one direction, and the other tooth in an opposite direction, the right hand side of the blade having that portion between the front and center teeth beveled, and the right face of the rear tooth being straight and the left face of the rear tooth being beveled, and the left face of the center tooth being straight, and the tip of the front tooth being beveled on the left side.

In testimony whereof I affix my signature.

RICHARD MORRIS.